United States Patent [19]

Bart

[11] Patent Number: 4,528,967

[45] Date of Patent: Jul. 16, 1985

[54] APPARATUS FOR HEATING THE FUEL-AIR MIXTURE BEING SUPPLIED BY A FUEL METERING SYSTEM FOR USE IN A FUEL INJECTION TYPE COMBUSTION ENGINE

[75] Inventor: Hansueli Bart, Whitehall, Mich.

[73] Assignee: Colt Industries Operating Corp., New York, N.Y.

[21] Appl. No.: 571,105

[22] Filed: Jan. 16, 1984

Related U.S. Application Data

[63] Continuation-in-part of Ser. No. 297,268, Aug. 28, 1981, abandoned.

[51] Int. Cl.$^3$ .............................................. F02M 31/12
[52] U.S. Cl. ..................................... 123/549; 123/546
[58] Field of Search ............... 123/437, 438, 439, 440, 123/472, 543, 546, 547, 549, 585, 586; 261/50 R, 78 R, DIG. 39

[56] References Cited

U.S. PATENT DOCUMENTS

| | | | |
|---|---|---|---|
| 1,421,606 | 7/1922 | Stevenson | 123/549 X |
| 3,353,520 | 11/1967 | Haag | 123/549 X |
| 3,915,137 | 10/1975 | Evans | 123/549 |
| 4,216,753 | 8/1980 | Inoue et al. | 123/445 |
| 4,292,945 | 10/1981 | Kiesling | 123/438 |
| 4,375,799 | 3/1983 | Swanson | 123/549 |

Primary Examiner—Parshotam S. Lall
Assistant Examiner—W. R. Wolfe
Attorney, Agent, or Firm—Walter Potoroka, Sr.

[57] ABSTRACT

A fuel metering apparatus is shown as having a throttle body with an induction passage therethrough and a throttle valve for controlling flow through the induction passage, a fuel-air-emulsion discharge member is situated generally in the induction passage downstream of the throttle valve, an air passage communicates between a source of air and the fuel-air-emulsion discharge member, the air passage has a flow restrictor therein which provides for sonic flow therethrough, a fuel metering valving assembly is effective for metering liquid fuel at a superatmospheric pressure and delivering such metered liquid fuel into the air passage upstream of the flow restrictor thereby causing the thusly metered liquid fuel and air to pass through the sonic flow restrictor before being discharged into the induction passage by the fuel-air-emulsion discharge member, the fuel-air-emulsion discharge member has a plurality of discharge ports spaced from each other and directed into the induction passage, a heater is provided in order to at least at times heat the fuel-air-emulsion discharge member in order to thereby heat the fuel-air-emulsion as flows through the fuel-air-emulsion discharge member.

22 Claims, 4 Drawing Figures

APPARATUS FOR HEATING THE FUEL-AIR MIXTURE BEING SUPPLIED BY A FUEL METERING SYSTEM FOR USE IN A FUEL INJECTION TYPE COMBUSTION ENGINE

RELATED APPLICATION

This application is a continuation-in-part of my application Ser. No. 297,268 filed on Aug. 28, 1981, now abandoned, for the invention entitled "APPARATUS FOR HEATING THE FUEL AIR MIXTURE BEING SUPPLIED BY A FUEL METERING SYSTEM FOR USE IN A FUEL INJECTION TYPE COMBUSTION ENGINE".

FIELD OF INVENTION

This invention relates generally to fuel injection systems and more particularly to fuel injection systems and apparatus for metering fuel flow to an associated combustion engine.

BACKGROUND OF THE INVENTION

Even though the automotive industry has over the years, if for no other reason than seeking competitive advantages, continually exerted efforts to increase the fuel economy of automotive engines, the gains continually realized thereby have been deemed by various levels of government as being insufficient. Further, such levels of government have also arbitrarily imposed regulations specifying the maximum permissible amounts of carbon monoxide (CO), hydrocarbons (HC) and oxides of nitrogen ($NO_x$) which may be emitted by the engine exhaust gases into the atmosphere.

Unfortunately, generally, the available technology employable in attempting to attain increase in engine fuel economy is contrary to that technology employable in attempting to meet the govermentally imposed standards on exhaust emissions.

For example, the prior art in trying to meet the standards for $NO_x$ emissions has employed a system of exhaust recirculation whereby at least a portion of the exhaust gas in reintroduced into the cylinder combustion chamber to thereby lower the combustion temperature therein and consequently reduce the formation of $NO_x$.

The prior art has also proposed the use of engine crankcase recirculation means whereby the vapors which might other-wise become vented to the atmosphere are introduced into the engine combustion chambers for further burning.

The prior art has also proposed the use of fuel metering means which are effective for metering a relatively overly rich (in terms of fuel) fuel-air mixture to the engine combustion chamber means as to thereby reduce the creation of $NO_x$ within the combustion chamber. The use of such overly rich fuel-air mixtures results in a substantial increase in CO and HC in the engine exhaust which, in turn, requires the supplying of additional oxygen, as by an associated air pump, to such engine exhaust in order to complete the oxidation of the CO and HC prior to its delivery into the atmosphere.

The prior art has also heretofore proposed employing the retarding of the engine ignition timing as a further means for reducing the creation of $NO_x$. Also, lower engine compression ratios have been employed in order to lower the resulting combustion temperature within the engine combustion chamber and therby reduce the creation of $NO_x$. In this connection the prior art has employed what is generally known as a dual bed catalyst. That is, a chemically reducing first catalyst is situated in the stream of exhaust gases at a location generally further away from the engine and downstream of the first catalyst. The relatively high concentrations of CO resulting from the overly rich fuel-air mixture are used as the reducing agent for $NO_x$ in the first catalyst while extra air supplied (as by an associated pump) to the stream of exhaust gases, at a location generally between the two catalysts, serves as the oxidizing agent in the second catalyst. Such systems have been found to have various objections in that, for example, they are comparatively very costly requiring additional conduitry, air pump means and an extra catalyst bed. Further, in such systems, there is a tendency to form ammonia which, in turn, may or may not be reconverted to $NO_x$ in the oxidizing catalyst bed.

The prior art has also proposed the use of fuel metering injection means for eliminating the usually employed carbureting apparatus and, under superatmospheric pressure, injecting the fuel through individual nozzles directly into the respective cylinders of a piston type internal combustion engine. Such fuel injection systems, besides being costly, have not proven to be generally successful in that the system is required to provide metered fuel flow over a very wide range of metered fuel flows. Generally, those prior art injection systems which are very accurate at one end of the required range of metered fuel flows, are relatively inaccurate at the opposite end of that same range of metered fuel flows. Also, those prior art injection systems which are made to be accurate in the mid-portion of the required range of metered fuel flows are usually relatively inaccurate at both ends of that same range. The use of feedback means for altering the metering characteristics of such prior art fuel injection systems has not solved the problem of inaccurate metering because the problem usually is intertwined within such factors as: effective aperture area of the injector nozzle; comparative movement required by the associated nozzle pintle or valving member; inertia of the nozzle valving member; and nozzle "cracking" pressure (that being the pressure at which the nozzle opens). As should be apparent, the smaller the rate of metered fuel flow desired, the greater becomes the influence of such factors thereon.

It is now anticipated that the said various levels of government will be establishing even more stringent exhaust emission limits.

The prior art, in view of such anticipated requirements, with respect to $NO_x$, has suggested the employment of a "three-way" catalyst, in a single bed, within the stream of exhaust gases as a means of attaining such anticipated exhaust emission limits. Generally, a "three-way" catalyst is a single catalyst, or catalyst mixture, which catalyzes the oxidation of hydrocarbons and carbon monoxide and also the reduction of oxides of nitrogen. It has been discovered that a difficulty with such a "three-way" catalyst system is that if the fuel metering is too rich (in terms of fuel) the $NO_x$ will be reduced effectively but the oxidation of CO will be incomplete; if the fuel metering is too lean, the CO will be effectively oxidized but the reduction of $NO_x$ will be incomplete. Obviously, in order to make such a "three-way" catalyst system operative, it is necessary to have very accurate control over the fuel metering function of the associated fuel metering means feeding the engine. As hereinbefore described, the prior art has suggested the use of fuel injection means, employing respective nozzles for each engine combustion chamber, with associated feedback means (responsive to selected indicia of engine operating conditions and parameters) intended to continuously alter or modify the metering characteristics of the fuel injection means. However, as also hereinbefore indicated, such fuel injection systems have not proven to be successful.

It has also heretofore been proposed to employ fuel metering means, of a carbureting type, with feedback means responsive to the presence of selected constituents comprising the engine exhaust gases. Such feedback means were employed to modify the action of a main metering rod of a main fuel metering system of a carburetor. However, tests and experience have indicated that such a prior art carburetor and such a related feedback means can never provide the degree of accuracy required in the metering of fuel to an associated engine as to assure meeting, for example, the said anticipated exhaust emission standards.

It is well known that in starting an engine, under cold starting conditions, it is difficult to achieve a sufficient fuel-vapor/air ratio to start the engine due to the low vapor pressures of gasoline to low temperatures. In conventional prior art carburetors, this problem is generally overcome by the use of a choke valve or plate as in the inlet of the induction passage with such choke valve serving to, at cold starting conditions, restrict the inlet of the induction passage thereby decreasing the pressure downstream thereof and causing a much greater quantity of fuel flow to be fed to the engine; such greater quantity of fuel is usually a rate of fuel flow far greater than the rate of fuel flow provided to the engine during normal engine temperature operating conditions. Therefore, even with a relatively small percentage of vaporization of such fuel, the increased amount of fuel provides a fuel-vapor/air ration sufficient to start and run the cold engine.

The prior art fuel injection systems experience the same problem even though, generally, injection systems exhibit improved fuel atomization characteristics as compared to carburetors. The prior art has attempted to solve this problem generally in the same way that carburetors have solved the problem. That is, since at cold conditions a lesser percentage of the fuel is vaporized, to overcome such vapor deficiency, more fuel is supplied as to achieve the total fuel vapor required. Accordingly, in such injection systems, the prior art has provided means responsive to engine and/or ambient temperature effective for causing increased metered rates of fuel flow during a preselected range of relatively low temperatures.

The prior art method, of thusly metering increasing rates of fuel flow during cold engine starting and operation, has several disadvatages. For example, and obviously, the practice of such prior art method requires far larger quantitites of fuel to be supplied to the engine than would otherwise be necessary (if the engine were at normal temperatures). Since, during such cold start conditions, only the lightest most volatile portion of the fuel vaporizes, the heavier or less volatile portions of the fuel either pass through the engine unburned or puddle as in the engine intake manifold. The fuel that thusly passes through the engine unburned exhibits itself as unburned hydrocarbons in the exhaust gases while the fuel that puddles eventually vaporizes, as the intake manifold warms-up with continued engine operation, making the fuel-air ratio then supplied to the engine overly rich (in terms of fuel) to the detriment of carbon monoxide emission production.

Another disadvantage of the prior art, namely, depending on the lightest or most volatile portion of the fuel to vaporize, is that such dependence, in turn, makes cold starting of an engine a direct function of fuel quality and a special blended winter fuel is required wherein a large fraction thereof is composed of highly volatile components in order to achieve good cold engine starting characteristics.

Accordingly, the invention as herein disclosed is primarily directed to the solution of the problems of the aforedescribed prior art and other related and attendant problems.

SUMMARY OF THE INVENTION

According to the invention, apparatus for metering fuel under superatmospheric pressure to an associated engine, comprises fuel delivery passage means, said fuel delivery passage means, comprising a fuel discharge means for discharging metered fuel to said engine, fuel flow metering means upstream of said fuel discharge means effective for metering fuel into said delivery passage means upstream of said fuel discharge means, and heater means effective for heating said metered fuel prior to its being discharged to said engine by said fuel discharge means.

Various general and specific objects, advantages and aspects of the invention will become apparent when reference is made to the following detailed description considered in conjunction with the accompanying drawings.

BRIEF DESCRIPTION OF DRAWINGS

In the drawings wherein for purposes of clarity certain details and/or elements may be omitted from one or more views.

DETAILED DESCRIPTION OF THE PREFERRED EMBODIMENT

Figure 1:
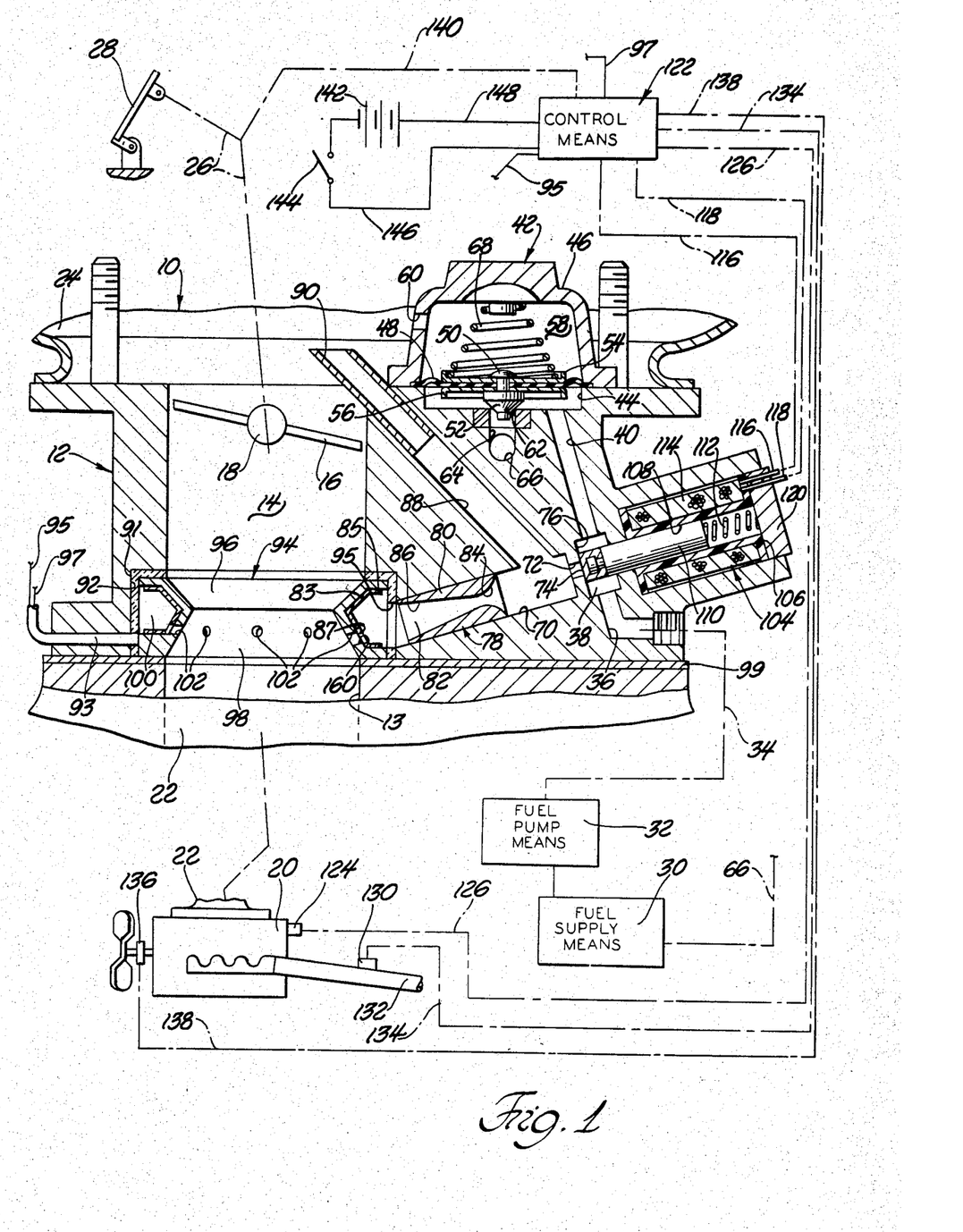
FIG. 1 is a generally vertical cross-sectional view of a form of fuel injection apparatus employing teachings of the invention with other possible ancillary details and/or elements being shown diagrammatically and/or schematically.

Referring now in greater detail to the drawings, FIG. 1 illustrates fuel injection apparatus 10 and system comprised as of induction body or housing means 12 having induction passage means 14 wherein a throttle valve 16 is situated and carried as by a rotable throttle shaft 18 for rotation therewith thereby variably restricting the flow of air through the induction passage means 14 and into the engine 20 as via associated engine intake manifold means 22. If desired suitable air cleaner means may be provided as to generally encompass the inlet of induction passage means 14 as generally fragmentarily depicted at 24. The throttle valve means 16 may be suitably operatively connected as through related linkage and motion transmitting means 26 to the operator positioned throttle control means which, as generally depicted, may be the operator foot-operated throttle pedal or lever 28 as usually provided in automotive vehicles.

A source of fuel as, for example, a vehicular gasoline tank 30, supplies fuel to associated fuel pumping means 32 which, in turn, delivers unmetered fuel as via conduit means 34 to conduit means 36 leading as to a chamber portion 38 which, in turn, communicates with passage or conduit means 40 leading to pressure regulator means 42 may comprise a recess or chamber like portion 44 formed in body 12 and a cup-like cover member 46. A deflectable diaphragm 48, operatively secured as to the stem portion 50 of a valving member 52 as through opposed diaphragm backing plates 54 and 56, is generally peripherally contained and retained between cooperating portions of body 12 and cover 46 as to thereby define variable and distinct chambers 44 and 58 with chamber 58 being vented as to a source of ambient atmospheric pressure as through vent or passage means 60. A valve seat or orifice memeber 62 cooperates with valving member 52 for controllably allowing flow of fuel therebetween and into passage means 64 and fuel return conduit means 66 which, as depicted, preferably returns the excess fuel to the fuel supply means 30. Spring means 68 situated as within chamber means 58 operatively engages diaphragm means 48 and resiliently urges valving member 52 closed against valve seat 62.

Generally, unmetered fuel may be provided to conduit means 36 and chamber 38 at a pressure of, for example, slightly in excess of 10.0 p.s.i. Passage 40 communicates such pressure to chamber 44 where it acts against diaphragm 48 and spring means 68 which are selected as to open valving member 52 in order to thereby vent some of the fuel and pressure as to maintain an unmetered fuel pressure of 10.0 p.s.i.

Chamber 38 is, at times, placed in communication with metered fuel passage means 70 as through metered fuel orifice means 72. As depicted, a metering valving member 74 is adapted to at times be seated as against a suitable seating surface 76 therby terminating fuel flow from chamber 38 through passage means 72 and into passage means 70. Passage means 70 may also contain therein venturi means 78 which may take the form of an insert like member having a body 80 with a venturi passage 82 formed therethrough as to have a converging inlet or upstream surface portion 84 leading to a venturi throat from which a diffuser surface portion 86 extends downstream. A conduit 88 having one end 90 communicating as with a source of ambient atmosphere has its other end communicating with metered fuel passage means 70 as at a point or area upstream of venturi restriction means 78 and, generally, downstream of metered fuel passage means 72.

A counterbore or annular recess 92 in body means 12 closely receives therein an annular or ring-like member 94 which, preferably, has an upper or upstream annular body portion 96 which converges and a lower or downstream annular body portion 98 which diverges. In the preferred arrangement, suitable electrical and thermal insulating means 91 is provided and situated as to be positioned generally between the the annular metered fuel discharge means 94 and the recess 92. As generally depicted, a first aperture is formed in the wall of insulating means 91 as to thereby enable the passage therethrough of electrical cable-like means 93. Also a second aperture or passage 95 is formed in insulating means 91 as to thereby enable complete communication as between passage 82 and the annulus or annular space 100 cooperatively defined as by the annular member 94 and insulating means 91. The annular space 100, as is evident from the drawing, communicates with metered fuel passage means 70 and the downstream or outlet end of restriction means 78. Preferably a plurality of discharge orifice means 102 are formed, in angularly spaced relationship, in annular member 94 as to be generally circumferentially thereabout. Further, preferably, such discharge orifice means are formed in the downstream diverging portion 98 as to be at or below the general area of juncture between upstream and downstream annular portions 96 and 98.

In the preferred embodiment, the memeber 94 is comprised of electrical and thermal insulating material carrying on the inner surface 83 a heating element 85 having openings 87 aligned with ports 102. That is, for example, the main structure 95 may be formed of, for example, such insulating material and may include therein electrically conductive mesh-like conductors the resistance of which, to electrical current flow therethrough, creates heat which is transferred to the surface of the annular member 94, preferably to only the inner surface thereof which coacts in defining the annulus or annular chamber 100. Also, among other possibilities, it is contemplated that (a) the annular member 94 may in fact carry a printed circuit type resistance means as along the surfaces thereof not forming a portion of the induction passage means or (b) the member 94 may be made of a ceramic or other suitable material that is or can be made electrically conductive for the above purpose. In any event, the heat generating means is electrically connected as to cable means 93 the leads 95 and 97 of which may be electrically connected as to control means 122.

In the preferred embodiment, body means 12 and the discharge means 94 are situated as onto the intake manifold in a manner whereby suitable insulating type gasket means 99 are interposed therebetween.

Valve member 74 is illustrated as comprising a portion of an overall oscillator type valving means or assembly 104 which is depicted as comprising a spool-like bobbin 106 having inner passage means 108 slidably receiving therein an armature means 110, carrying valve member 74, and spring means 112 yieldingly urging armature 110 and valve member 74 generally toward the left and into seated engagement with valve seat means 76 terminating communication of chamber 38 with passage or conduit means 72. A field or solenoid winding or coil 114 is carried by the bobbin 106 and has its opposite electrical ends connected as to electrical conductors 116 and 118 which may pass through suitable closure means 120 and be electrically connected as to related control means 122. The practice of the invention is not limited to, for example, a particular fuel metering means; however, in the preferred embodiment, the metering valving means 104 is of the duty-cycle type wherein the winding 114 is intermittently energized thereby causing, during such energization, armature 110 and valve member 74 to move in a direction away from valve orifice 72 or valve seat 76. As should be apparent, with such a duty-cycle type metering solenoid assembly the effective flow area of valve orifice or passage 72 can be variably and controllably determined by controlling the frequency and/or duration of the energization of coil means 114.

The control means 122 may comprise, for example, suitable electronic logic type control and power output means effective to receive one or more parameter type input signals and in response thereto produce related outputs. For example, engine temperature responsive transducer means 124 may provide a signal via transmission means 126 to control means 122 indicative of the engine temperature; sensor means 130 may sense the relative oxygen content of the engine exhaust gases (as within engine exhaust conduit means 132) and provide a signal indicative thereof via transmission means 134 to control means 122; engine speed responsive transducer means 136 may provide a signal indicative of engine speed via transmission means 138 to control means 122 while engine load, as indicated, for example, by throttle valve 16 position may provide a signal as via transmission means 140 to control means 122. A source of electrical potential 142 along with related switch means 144 may be electrically connected as by conductor means 146 and 148 to control means 122.

OPERATION OF INVENTION

Generally, in the embodiment disclosed, fuel under pressure is supplied as by fuel pump means 32 to conduit 36 and chamber 38 (and regulated as to its desired pressure by regulator means 42) and such fuel is metered through the effective metering area of valve orifice means 72 to conduit portion 70 from where such metered fuel flows through restriction means 78 and into annulus 100 and ultimately through discharge port means 102 and to the engine 20. The rate of metered fuel flow, in the embodiment disclosed, will be dependent upon the relative percentage of time, during an arbitrary cycle time or elapsed time, that the valve member 74 is relatively close to or seated against orifice seat 76 as compared to the percentage of time that the valve member 74 is relatively far away from the cooperating valve seat 76.

This, in turn, is dependent on the output to coil 114 from control means 122 which, in turn, is dependent on the various parameter signals received by the control means 122. For example, if the oxygen sensor and transducer means 130 senses the need of a further fuel enrichment in the motive fluid being supplied to the engine and transmits a signal reflective thereof to the control means 122, the control means 122, in turn, will require that the metering valve 74 be opened a greater percentage of time as to provide the necessary increased rate of metered fuel flow. The practice of the invention is not limited to a particular form of fuel metering means or to a particular system for the control of such fuel metering means. Accordingly, it will be understood that given any selected parameters and/or indicia of engine operation and/or ambient conditions, the control means 122 will respond to the signals generated thereby and respond as by providing appropriate energization and de-energization of coil means 114 (causing corresponding movement of valve member 74) thereby achieving the then required metered rate of fuel flow to the engine.

The prior art has employed relatively high pressures both upstream and downstream of the fuel metering means in an attempt to obtain sufficient fuel atomization within the induction passage means. Such have not proven to be successful.

It has been discovered that the invention provides excellent fuel atomization characteristics even when the upstream unmetered fuel pressure is in the order of 10.0 p.s.i. (the prior art often employing upstream unmetered fuel pressures in the order of 40.0 p.s.i.). The preferred embodiment achieves this by providing a high velocity air stream into which all the metered fuel is injected, mixed and atomized and subsequently delivered to the engine induction passage.

That is, more particularly, in the preferred embodiment, conduit means 88 supplies all of the air needed to sustain idle engine operation when the throttle valve means 16 is closed. As can be seen a flow cirucit is described by inlet 90 of conduit 88, conduit 88, passage means 70, passage means 82, annulus 100, orifice means 102 and engine intake manifold induction passage means 13; such, in the preferred embodiment of the invention, provides all of the air flow to the engine 20 required for idle engine operation. The fuel which is metered by valve member 74 and injected into passage 70 mixes with the air as the metered fuel and air flow into inlet 84 of venturi nozzle-like means 78 and become accelerated to sonic velocity. The fuel within such fuel-air-emulsion becomes atomized as it undergoes acceleration to sonic velocity and subsequent expansion in portion 86 of venturi means 78. The fuel-air-emulsion then passes into annulus 100 and is discharged, generally circumferentially of induction passage means 14, through the discharge port means 102 of diffuser means 94 and into passage means 13 of engine 20 thereby mixing with the air flowing through the induction passage means 13 and forming a combustible-fuel-air-mixture. In the preferred embodiment of the invention, the restriction means 78 not only provides for sonic flow therethrough during idle engine operation but also provides for sonic flow therethrough during conditions of engine operation other than idle and, preferably over at least most of the entire range of engine operation.

When further engine power is required, throttle valve means 16 is opened to an appropriate degree and the various related parameter sensing means create input signals to control means 122 resulting in fuel metering means 104 providing the corresponding increase in the rate of metered fuel to the passage 70 and, as hereinbefore described, ultimately to engine 20.

As should be apparent, suitable temperature responsible means may be provided in order to slightly open throttle valve 16 during cold engine idle operation and preclude rough engine operation.

It can be seen that in the preferred embodiment the diffuser or discharge nozzle means 94 is comprised of a plurality of generally radially extending circumferentially spaced discharge ports or apertures 102 and that at least one, as at 160, of the apertures or ports 102 is situtated as to be generally aligned with the path of flow from the sonic nozzle or restrictor means 78.

To better illustrate such, all apertures or discharge ports 102, except for the one identified at 160, are illustrated as having their respective axis generally contained as within a common plane generally normal to the axis of the induction passage means 14. However, as indicated in FIG. 1 discharge port or aperture 160 is generally aligned with the nozzle 78 axis which, in the preferred embodiment, is inclined (and not normal) to the axis of the induction passage 14.

It has been discovered that good engine and vehicle performance can be obtained even though the spacing as between discharge ports 102 be varied and even though the angle of discharge of such ports 102 (or any of them) be varied. However, it has also been discovered that unsatisfactory engine performance occurs when discharge port or aperture means such as depicted at 160 is not provided.

For purposes of illustration, let it be assumed that engine 20 is operating at, for example, curb idle conditions, and, further, let it be assumed that aperture or discharge passage means 160 is not generally aligned with the axis of the flow path from the nozzle means 78. At this time, the air flow to the engine 20 will be at a minimum and, it may be reasonably assumed that substantially the entire idle air flow is provided via passage means 88, 70, 82, annulus 100 and ports 102. During such time, of course, the metering valve assembly 104 serves to provide the idle rate of metered fuel flow, to the air flowing through passage 82, as already herein described. Still under such assumed conditions it can be seen that the fuel-air-emulsion passing through restrictor means 78 enters the annulus 100 and generally divides into two oppositely directed flows one passing generally counter-clockwise and the other passing generally clockwise (as viewed from above) with each of such flows supplying the discharge ports 102 along the respective flow paths. It can be appreciated that the velocity of flow of such oppositely directed flows of fuel-air-emulsion decreases along the annulus 100 and is considerably less than the velocity of flow of such fuel-air-emulsion passing through and exiting from passage 82 of restrictor 78.

Now let the assumed conditions be changed only to the extent that, for example, a sudden increased load is placed upon the engine 20 and the operator causes the throttle 16 to be rotated, for example, to wide-open or nearly wide-open position. As a consequence, the fuel metering valving assembly 104 will instantly respond by providing the corresponding required rate of fuel flow and the air-flow to the engine will, almost, instantly increase. However, the increase in air flow will occur as a consequence of the opening of throttle valve 16 with the velocity of air flow through passages 88 and 82, and annulus 100 remaining, for all practical purposes, constant and the same volume rate as existed at idle engine operation. As a result of this it can be seen that even though the rate of metered fuel flow is, in effect, instantly increased and even though the volume rate of air flow to the engine is, in effect, instantly increased, the time which it takes for such increased fuel flow to merge with the increased air flow reamains the same as existed during idle engine operation. That is, the two flows of fuel-air-emulsion (now richer in terms of fuel) still have to pass through the annulus 100 before being discharged into the induction passage. This, in turn, means that initially the increased air flow reaches the engine 20 quicker than the increased fuel flow resulting in a leaning-out of the fuel-air-emulsion as initially received by the engine with attendant rough and uneven engine operation as well as loss of power.

It has been discovered that such problems can be, and in fact are, overcome by placing the discharge port means 160 as to be generally in alignment with the general axis of the the path of flow of the fuel (or fuel-air-emulsion) flowing through and out of restrictor passage 82. Although it is not known for certain, it is believed that by thusly providing a generally aligned discharge port or means 160, when a sudden increase in engine load is experienced, as previously assumed from, for example, idle operation to wide-open throttle operation, at least a significant portion of the initially increased rate of metered fuel flow passing from the restrictor means 78 is flowed directly through the aligned discharge aperture or port means 160 and such portion is sufficient to provide the almost instantaneously required increase in fuel flow to the engine as to maintain the required fuel-air ratio received by the engine. It should be apparent that the actual configuration of the aperture or port means 160 is not restricted to being cylindrical nor is it limited to being a single aperture or port in such alignment with the path of flow from passage 82. It is contemplated that in some applications of the invention it may be desirable to provide particularly tailored configurations of such port means 160 as well as possibly providing a plurality of, for example, closely grouped ports or passages which collectively serve the function of such port means 160.

In the embodiment disclosed, when, for example, the transducer 124 senses that the engine 20 temperature is less than a preselected magnitude and creates an output signal indicative thereof, the concontrol means 122 responds as by completing a circuit through conductors 95 and 97 along with the related resistance heating means comprising the annular discharge means 94 thereby raising the temperature of such annular discharge means 94. As a consequence thereof, as fuel (or a fuel-air emulsification) flows through the annulus 100 and as such fuel-air emulsification comes into contact with the heated surfaces of discharge member 94, it becomes heated thereby. The resulting increase in the temperature of such fuel, in turn, results in an increase in vapor pressure of the fuel and, consequently, as such heated fuel-air emulsification is discharged (as via port means 102) to the engine the increased vapor pressure of the fuel results in an increase in the percentage of such fuel which is vaporized. With such an increase in the percentage of the fuel being vaporized (and therefore a greater total of fuel available for combustion during cold start engine starting and operation) it becomes possible to readily start a cold engine and provide a sufficient fuel-air ratio for continued operation of the cold engine.

Of course, when the transducer means 124 subsequently senses that the engine is operating at, for example, its normal warmed temperature, the signal resulting therefrom causes control means 122 to open the circuit through the resistance heating means of discharge means 94 thereby causing its de-energization. It should be apparent that various materials and devices are known in the art with which the discharge means 94 can be made to be heated.

It should be pointed out that in the practice of the invention the heated discharge means 94 has to heat only a small portion of the air mass flowing to the engine. Such air, of course, is principally, the air being flowed through the nozzle-like restriction means 78. In this connection it should be brought out that the venturi like restriction means 78 could also be made to be heated and, further, could be made of plastic material which repels water as may be carried in the air flowing therethrough.

Figure 2:
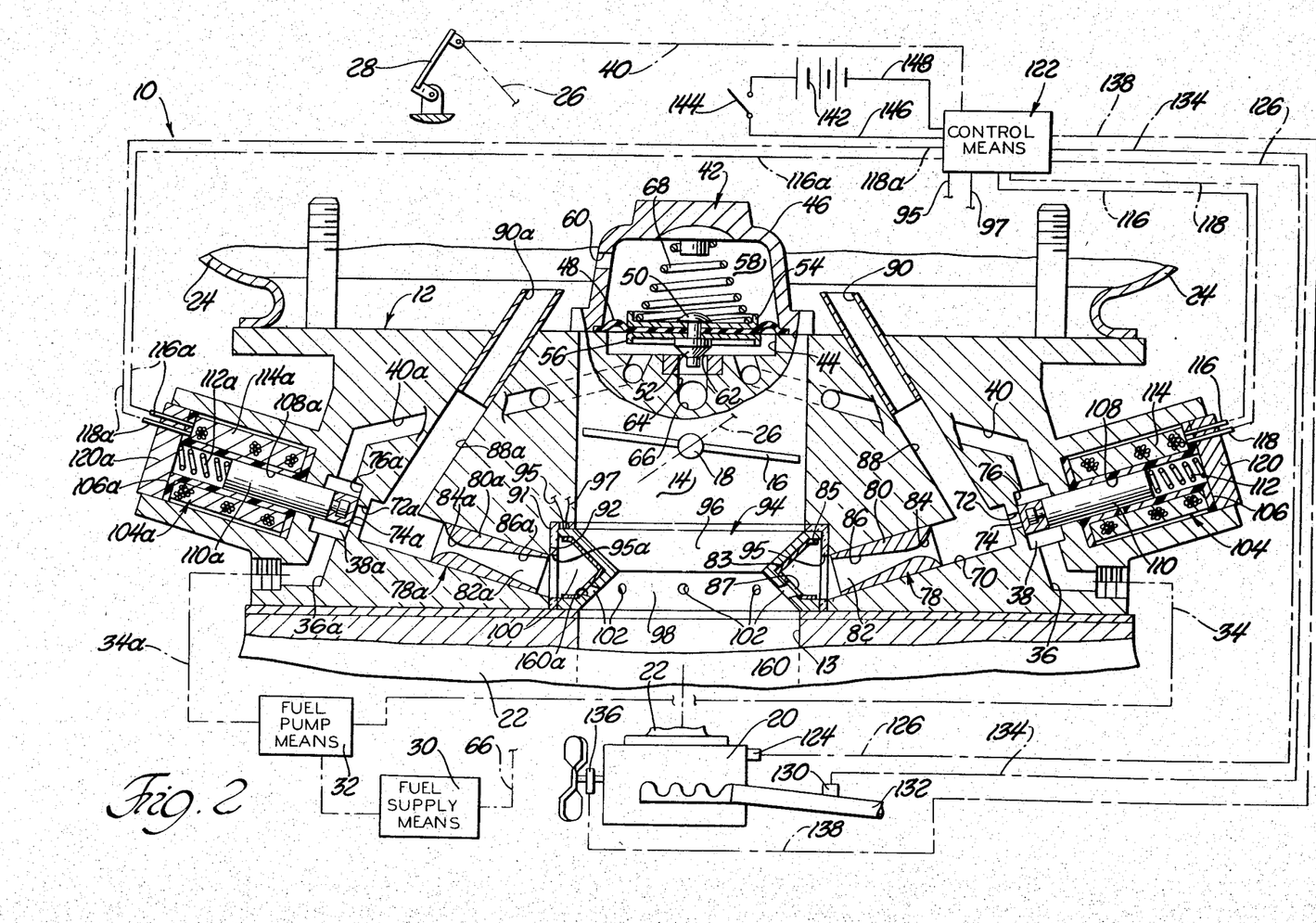
FIG. 2 is a view similar to that of FIG. 1 but illustrating another embodiment emplying teachings of the invention.

FIG. 2 illustrates another embodiment of the invention. In FIG. 2 elements which are like or similar to those of FIG. 1 are identified with like reference numerals; where in FIG. 2 there is more than one element which is like or similar to those of FIG. 1, such additional elements are identified with like reference numerals provided with a suffix "a".

Generally, in the embodiment disclosed in FIG. 2, fuel under pressure is supplied as by fuel pump means 32 to conduits 34 and 34a, conduits 36 and 36a, and to chambers 38 and 38a (and regulated as to its pressure by virtue of regulator means 42 communicating with both chambers 38 and 38a via conduit means 40 and 40a, respectively) and such fuel is metered through the effective metering areas of valve orifice means 72 and 72a to conduit portions 70 and 70a from where such metered fuel flows through respective restriction means 78 and 78a and into annulus 100 and, ultimately, through discharge port means 102 and to the engine 20. The rate of metered fuel flow, in the embodiment disclosed, will be dependent upon the relative percentage of time, during an arbitrary cycle time or elapsed time, that the valving memebers 74 and 74a are relatively close to or seated against respective orifice seats 76 and 76a as compared to the percentage of time that the valving members 74 and 74a are relatively far away from the respective cooperating valve seats 76 and 76a.

This, in turn, is dependent on the output to coils 114 and 114a from control means 122 which, in turn is dependent on the various parameter signals received by the control means 122. For example, if the oxygen sensor and transducer means 130 senses the need of a further fuel enrichment in the motive fluid being supplied to the engine and transmits a signal reflective thereof to the control means 122, the control means 122, in turn will require that the metering valves 74 and 74a be opened a greater percentage of time as to provide the necessary increased rate of metered flow. The practice of the invention is not limited to a particular form of fuel metering means or to a particular system for the control of such fuel metering means. Accordingly, it will be understood that given any selected parameters and/or indicia of engine operation and/or ambient conditions, the control means 122 will respond to the signals generated thereby and respond as by providing appropriate energization and de-energization of coil means 114 and 114a (causing corresponding movement of valve members 74 and 74a) thereby achieving the then required metered rate of fuel flow to the engine.

It has been discovered that the invention provides excellent fuel atomization characteristics even when the upstream unmetered fuel pressure is only in the order of 10.0 p.s.i. (the prior are often employing upstream unmetered fuel pressures in the order of 40.0 p.s.i.). The invention achieves this by providing a high velocity air stream into which all the metered fuel is injected, mixed and atomized and subsequently delivered to the engine induction passage.

That is, more particularly, in the preferred form of the embodiment of FIG. 2, conduit means 88 and 88a supply all of the air needed to sustain idle engine operation when the throttle valve means 16 is closed. As can be seen a first flow circuit is described by inlet 90 of conduit 88, conduit 88, passage means 70, passage means 82, annulus 100, orifice means 102 and engine intake manifold induction passage means 13 while a second flow circuit is described by inlet 90a of conduit 88a, conduit 88a, passage means 70a, passage means 82a, annulus 100, orifice means 102 and engine intake manifold induction passage means 13; such, in the preferred embodiment of the invention, provides all of the air flow to the engine 20 required for idle engine operation. The fuel which is metered by valve members 74 and 74a and respectively injected into passages 70 and 70a mixes with the air as the metered fuel and air flow into respective inlets 84 and 84a of venturi nozzle-like means 78 and 78a and becomes accelerated to sonic velocity and subsequent expansion in respective portions 86 and 86a of venturi means 78 and 78a. The atomized fuel-air-emulsion then passes into annulus 100 and is discharged, generally circumferentially of induction passage means 14, through the discharge port means 102 of diffuser means 94 and into passage means 13 of engine 20 thereby mixing with the air flowing through the induction passage means 13 and forming a combustible-fuel-air-mixture. In the preferred form of the embodiment of FIG. 2, the restiction means 78 and 78a not only provide for sonic flow therethrough during idle engine operation but also provide for sonic flow therethrough during conditions of engine operation other than idle and, preferably, over at least most of the entire range of enge operation.

When further engine power is required, throttle valve means 16 is opened to an appropriate degree and the various related parameter sensing means create input signals to control means 122 resulting in fuel metering means 104 and 104a providing the corresponding increase in the rate of metered fuel to the passages 70 and 70a and, as hereinbefore described, ultimately to engine 20.

In the preferred form of the embodiment of FIG. 2, the diffuser or discharge nozzle means 94 is comprised of a plurality of generally radially extending circumferentially spaced discharge ports or apertures 102. Further, in the preferred form, the two metering means 104 and 104a, as well as the nozzles 78 and 78a, are situated as to be generally diametrically opposed to each other. Also, the respective axes of nozzles 78 and 78a are each preferably inclined (and not normal) to the axis of the induction passage 14.

Of such plurality of discharge ports 102 at least one, identified at 160, is situated as to be generally aligned with the path of flow from the sonic nozzle or restrictor means 78 and at least one, identified at 160a, is situated as to be generally aligned with the path of flow from the sonic nozzle or restrictor means 78a. All apertures or discharge ports 102, except for discharge ports 160 and 160a, may, as illustrated, have their respective axes generally contained as within a common plane normal to the axis of the induction passage means 14.

It has been discovered that good engine and vehicle performance can be obtained even though the spacing as between discharge ports 102 be varied and even though the angle of discharge of such ports 102 (or any of them), except for ports 160 and 160a, be varied. However, it has also been discovered that unsatisfactory engine performance occurs when discharge port or aperture means such as depicted at 160 and 160a are not provided.

For purposes of illustration, let it be assumed that engine 20 is operating at, for example, curb idle conditions, and, further, let it be assumed that aperture or discharge passage means 160 and 160a are not generally aligned with the axes of the respective flow paths from nozzle means 78 and 78a. At this time, the air flow to the engine 20 will be at a minimum and, it may be reasonably assumed that substantially the entire idle air flow is provided via passage means 88, 70, 82, 88a, 70a, 82a, annulus 100 and ports 102. During such time, of course, the metering valve assemblies 104 and 104a serve to provide the idle rate of metered fuel flow, respectively to the air flowing through passages 82 and 82a, as already herein described. Still under such assumed conditions it can be seen that the fuel-air-emulsion passing through restrictor means 78 enters the annulus 100 and generally divides into two oppositely directed flows one passing generally counter-clockwise and the other passing generally clockwise (as viewed from above) with each of such flows supplying the discharge ports 102 along the respective flow paths. It can be appreciated that the velocity of flow of such oppositely directed flows of fuel-air decreases along the annulus 100 and is considerably less than the velocity of flow of such fuel-air passing through and exiting from passage 82 of restrictor 78. Similarly, the fuel-air-emulsion passing through restrictor means 78a enters the annulus 100 and generally divides into two oppositely directed flows one passing generally clockwise and the other passing generally counter-clockwise (as viewed from above) with each of such flows supplying the discharge ports 102 along the respective flow paths. In like manner it can be aprreciated that the velocity of flow of such oppositely directed flows of fuel-air also decreases along the annulus 100 and is considerably less than the velocity of flow of such fuel-air passing through and exiting from passage 82a of restrictor 78a.

Now let the assumed conditions be changed only to the extent that, for example, a sudden increased load is placed upon the engine 20 and the operator causes the throttle 16 to be rotated, for example, to wide-open or nearly wide-open position. As a consequence, the fuel metering valving assemblies 104 and 104a will instantly respond by providing the corresponding required rate of fuel flow and the air flow to the engine will, almost, instantly increase. However, the increase in air flow will occur as a consequence of the opening of the throttle valve 16 with the velocity of air flow through passages 88, 82, and 88a, 82a as well as annulus 100 remaining, for all practical purposes, constant and the same volume rate as existed at idle engine operation. As a result of this it can be seen that even though the rate of metered fuel flow is, in effect, instantly increased and even though the volume rate of air flow to the engine is, in effect, instantly increased, the time which it takes for such increased fuel flow to merge with the increased air flow remains the same as existed during idle engine operation. That is, the two flows of fuel-air-emulsion (now richer in terms of fuel) still have to pass through the annulus 100 before being discharged into the induction passage. This in turn, means that initially the increased air flow reaches the engine 20 quicker than the increased fuel flow resulting in a leaning-out of the fuel-air-emulsion as initially received by the engine with attendant rough and uneven engine operation as well as loss of power.

It has been discovered that such problems can be, and in fact are, overcome by placing the discharge port means 160 and 160a as to be generally respectively in alignment with the general axes of the paths of flow of the fuel-air-emulsion flowing through and out of restrictor passages 82 and 82a. Although it is not known for certain, it is believed that by thusly providing generally aligned discharge ports or means 160 and 160a, when a sudden increase in engine load is experienced, as previously assumed from, for example, idle operation to wide-open throttle operation, at least a significant portion of the initially increased rate of metered fuel flow passing from the restrictor means 78 and 78a is flowed directly through the respective aligned discharge aperture or port means 160 and 160a *and such portion is sufficient to provide the almost instantaneously required increase in fuel flow to the engine as to maintain the required fuel-air ration received by the engine. It should be apparent that the actual configuration of the aperture or port means 160 and 160a is not restricted to being cylindrical nor is it limited to being a single aperture or port* in such respective alignment with the paths of flow from passages 82 and 82a. It is contemplated that in some applications it may be desirable to provide particularly tailored configurations of such port means 160 and/or 160a as well as possibly providing a plurality of, for example, closely grouped ports or passages which collectively serve the function of such port means 160 and/or 160a.

Further, by providing a plurality of such fuel metering valving assemblies 104 and 104a, it becomes possible to supply the proper metered rates of fuel flow to a comparatively larger engine without requiring, for example, dual induction passages 14. Another benefit is that if, for example, one of the metering valving assemblies 104 or 104a should fail (during engine operation) the remaining metering valving assembly 104 or 104a will actually increase its rate of metered fuel flow as to either partially or totally compensate for the failed metering valving assembly. This becomes particularly evident when one considers that in the preferred form of the overall system, the control means 122 receives signals indicative of whether, for example, sufficient fuel is being metered. It (the control means 122) does not know whether either of the metering valving assemblies 104 or 104a are inoperative (failed). Therefore, if upon failure of either assembly 104 or 104a the control means 122 obtains a signal or signals indicative of a too lean (in terms of fuel) fuel-air mixture, the control means 122 merely creates an output signal calling for a greater rate of metered fuel flow and such would be ultimately received by and responded to by the still operative metering valving assembly 104 or 104a.

As in the embodiment of FIG. 1, the member 94 of FIG. 2 preferably comprises positive temperature coeffecient material and may, in the main, also be comprised of ceramic or other suitable material The operation of the heater means (the electrical leads of which are, in simplified form illustrated at 95 and 97 of FIG. 2) operates in the manner already described with reference to FIG. 1. Again, in the embodiment of FIG. 2, the heated discharge means 94 has to heat only a small portion of the air mass flowing to the engine. Such air, of course, is principally the air being flowed through the nozzle-like restriction means 78 and 78a. As in the embodiment of FIG. 1, it is contemplated that the venturi like restriction means 78 and 78a could also be made to be heated, and further, could be made of plastic material which repels water as may be carried in the air flowing therethrough.

Figure 3:
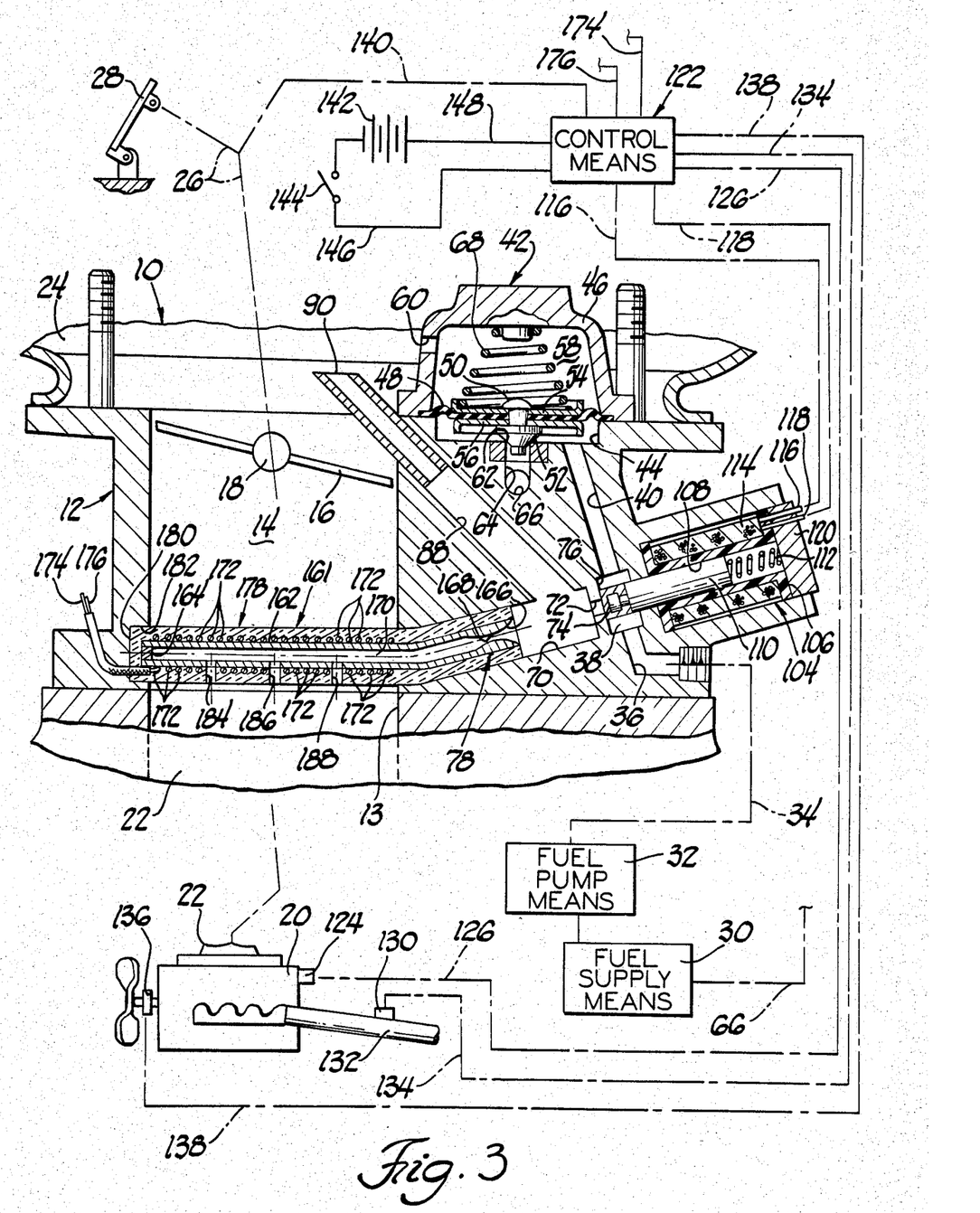
FIG. 3 is a view similar to that of FIG. 1 but illustrating another emodiment employing teachings of the invention.

FIG. 3 illustrates another form of the invention. All elements in FIG. 3 which are like or similar to those of FIG. 1, except as may be noted to the contrary, are identified with like reference numbers and, accordingly, the operation thereof will not again be discussed since the operation thereof would be as already described with regard to FIG. 1.

Referring in greater detail to FIG. 3, a heatable bar-like fuel discharge means 161 is illustrated, in its preffered embodiment, as comprising an inner tubular member 162 which extends transversely of and through induction passage means 14 as to, at one end, terminate in a closure 164 and at its other end terminate as in an upstream venturi or restriction portion or means 78. The restriction means 78 preferably has a venturi inlet 166 communicating with a venturi throat or passage portion 168 which, in turn, communicates with a generally cross-sectionally expanded longitudially extending internal passageway or conduit means 170 of tubular member 162.

Generally surrounding the outer surface of the tubular member 162 is a coiled electrically conductive resistance means, such as, for example, a resistance wire 172 which has its opposite ends connected as to leads 174 and 176 which may be connected to any suitable source of electrical potential as for example 142. Such connection would, of course, be preferably made as through the control means 122 so that the heating means 172 would be energized only during those periods of engine operation (which may include engine cranking) when the various sensed operating parameters indicate the desirability or necessity of heating the fuel-air-emulsion flowing through passage means 170.

In the preferred embodiment of the structure of FIG. 3, the heating means 172 is placed in intimate contact with the exterior surface of tubular member 162 as to maximize heat transfer from the heating means 172 to the tubular member 162 and the fuel-air emulsion flowing through conduit or passage means 170.

The tubular 162 and the heating means 172 are, in turn, covered or enclosed, or by possibly an encapsulating-like process, with electrical and heat insulating means 178 forming a generally tubular-like configuration. One end of the insulating means 178 is closed or at 180 and that end portion is received as within a closely fitting recess 182 formed in one generally diametral side of the induction passage 14. The other end of the insulating means 178, along with the restriction means 78, is received in passage means 70 which is generally diametrically opposed to the recess means 182.

As generally depicted, the heating means 172 is preferably covered by a substantial amount of such insulating means 178 as to thereby direct the maximum amount of heat flow toward the tubular member 162 and if not totally prevent then at least minimize the amount of heat radiating outwardly from the nozzle means 161. In the preferred embodiment the insulating means 178 would be molded about the tubular member 162 and the heating means 172 carried thereabout.

Further, in the preferred embodiment, a plurality of discharge passages 184, 186 and 188 would be formed in the lower disposed portion (as viewed in FIG. 3) through which the fuel-air-emulsion, from within conduit means 170, would be discharged into the induction passage 14 or directly into the intake manifold induction passage means 13.

For purposes of illustration, and still referring to FIG. 3, let it be assumed that engine 20 is operating at, for example, curb idle conditions. At this time, the air flow to the engine 20 will be at a minimum and, it may be reasonably assumed that substantially the entire idle air flow is provided via passage means 88, 70, 168, 170 and ports or passages 184, 186 and 188. During such time, of course, the metering valve assembly 104 serves to provide the idle rate of metered fuel flow, to the air flowing through passage means 70 and 168 as in the manner generally described with regard to FIG. 1. Still under such assumed conditions it can be seen that the fuel-air-emulsion passing through restrictor means 78 enters the nozzle means 161 passage 170 from where such fuel-air-emulsion flows outwardly through passages or ports 184, 186 and 188 into the induction passage means.

In the embodiment disclosed, when, for example, the transducer 125 senses that the engine 20 temperature is less than a preselected magnitude and creates an output signal indicative thereof, the control means 122 responds as by completing a circuit through conducters 174 and 176 along with the related resistance heating means 172 thereby raising the temperature of the tubular member 162. As a consequence thereof, as fuel (or a fuel-air emulsification) flows through the conduit or passage 170 and, as such fuel-air emulsification comes into contact with the heated surface of tubular member 162, it becomes heated thereby. The resulting increase in the temperature of such fuel, in turn, results in an increase in vapor pressure of the fuel and, consequently, as such heated fuel-air-emulsion is discharged (as via port means 184, 186, 188) to the engine the increased vapor pressure of the fuel results in an increase in the percentage of such fuel which is vaporized. With such an increase in the percentage of the fuel being vaporized (and therefore a greater total of fuel available for combustion during cold start engine starting and operation) it becomes possible to readily start a cold engine and provide a sufficient fuel-air ratio for continued operation of the cold engine.

Of course, when the transducer means 124 subsequently senses that the engine is operating at, for example, its normal warmed temperature, the signal resulting therefrom causes control means 122 to open the circuit through the resistance heating means 172 thereby causing its de-energization. It should be apparent that various materials and devices are known in the art with which the discharge nozzle means 161 can be made to be heated.

It should be pointed out that in the practice of the invention the heated discharge nozzle means 161 has to heat only a small portion of the air mass flowing to the engine. Such air, of course, is principally, the air being flowed through the nozzle-like restriction means 78. In this connection it should be brought out that the venturi like restriction means 78, as well as the tubular member 162, could also be made to be heated and, further, could be made of plastic material which repels water as may be carried in the air flowing therethrough The nozzle means 161, in the preferred embodiment, is generally cylindrical configuration; however, it is contemplated that the nozzle means 161 may be of my desired transverse cross-sectional configuration, streamlined or otherwise as, for example, of a transverse cross-sectional elliptical configuration. Further, even though the electrical resistance heating means 172 has been illustrated as being situated extremely of the tubular member 162, it is also contemplated that such resistance heating means 172 could be situated internally of the the tubular member 162, preferably against the inner surface thereof.

Figure 4:
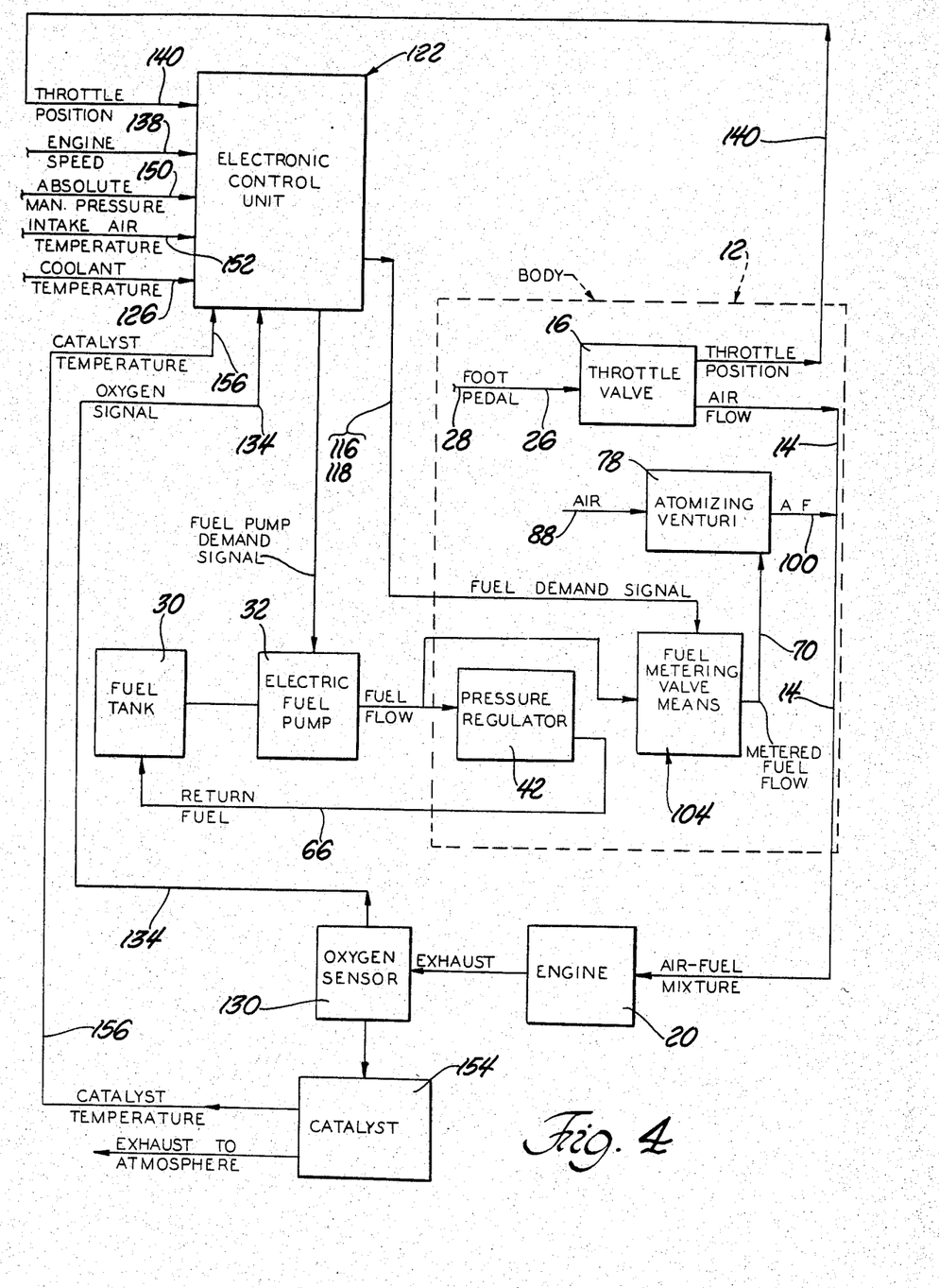
FIG. 4 is a block diagram of an entire fuel metering system as may be applied to or employed in combination with the apparatus of either FIGS. 1, 2 or 3.

FIG. 4 illustrates, in general block diagram, the invention as disclosed in either FIGS. 1, 2 or 3 along with other contemplated operating and indicia sensing means for creating related inputs to the control means which, as generally identified in FIG. 4, may be an electronic control unit. For ease of reference, elements in FIG. 4 which correspond to those of FIG. 1 are identified with like reference numerals. It will be understood that even though reference is made to FIG. 1, such could just as well be made to the structure of FIGS. 2 or 3 since the various elements of FIGS. 1, 2 and 3 are at least functionally the same.

As generally depicted in FIG. 4 the electronic control or logic means 122 is illustrated as receiving input signals, as through suitable transducer means, reflective and indicative of various engine operating parameters and indicia of engine operation. For example, it is contemplated that the electronic logic or control means 122 would receive, as inputs, signals of the position of the throttle valve means 16 as via transducer or transmission means 140; the magnitude of the engine speeds as by transducer or transmission means 138; the magnitude of the absolute pressure within the engine intake manifold 22 as by transducer or transmission means 150; the temperature of the air at the inlet of the induction system as by transducer or transmission means 152; the magnitude of the engine 20 coolant system temperature as via transducer or transmission means 126; the magnitude of the engine exhaust catalyst 154 temperature as by transducer or transmission means 156; and the percentage of oxygen (or other monitored constituents) in the engine exhaust as by transducer or transmission means 134.

In considering both FIGS. 1 and 4 it can be seen that the electronic control means 122, upon receiving the various input signals, creates a first output signal as along conductor means 116 and 118 thereby energizing fuel metering valving means 104. If the operator should open throttle valve means 16, as through pedal 28 and linkage or transmission means 26, the new position thereof is conveyed to the control means 122 and an additional rate of air flow is permitted into the induction passage means 14 as to become commingled with the motive fluid being discharged by the nozzle means 94 (nozzle means 160 of FIG. 3.

In any event, the fuel-air mixture is introduced into the engine 20 (as via intake manifold means 22) and upon being ignited and performing its work is emitted as exhaust. An oxygen or other gas sensor, or the like, 130 monitors the engine exhaust gases and in accordance therewith creates an output signal via transducer means 134 to indicate whether the exhaust gases are overly rich, in terms of fuel, too lean, in terms of fuel, or exactly the proper ratio. The electronic control means, depending upon the nature of the signal received from the gas sensor 134, produces an output signal as via conductor means 116 and 118 for either continuing the same duty cycle of fuel metering valve means 104 or altering such as to obtain a corrected duty cycle and corresponding altered rate of metered fuel flow. Generally, each of such input signals (varying either singly or collectively) to the electronic control means (except such as will be noted to the contrary) will, in turn, cause the electronic control means 122 to produce an appropriate signal to the fuel metering valve assembly 104.

As is also best seen in FIG. 4, a fuel supply or tank 30 supplies fuel to the inlet of a fuel pump 32 (which may be electrically driven and actually be physically located within the fuel tank means 30) which supplies unmetered fuel to suitable pressure regulator means 42 which is generally in parallel with fuel metering valving assembly 104. Return conduit means 66 serves to return excess fuel as to the inlet of pump means 32 or, as depicted, to the fuel tank means 30. Fuel, unmetered, at a regulated pressure is delivered via conduit means 36 to the upstream side of the effective fuel metering orifice as determined by orifice means 72 with coacting valving member 74.

It is also contemplated that certain fuel metering functions may be or will be performed in an open loop manner as a fuel schedule which, in turn, is a function of one or more input signals to the control means 122. For example, it is contemplated that acceleration fuel could be supplied and metered by the fuel metering valving assembly 104 as a function of the position of such throttle valve means 16 while the engine cranking or starting fuel and cold engine operation fuel metering schedule would be a function of engine temperature, engine speed and intake manifold pressure. Further, it is contemplated that open loop scheduling of metered fuel flow would be or could be employed during catalytic converter warm-up and for maximum engine power as at wide open throttle conditions as well as being employed during and under any other conditions considered necessary or desirable. Although only a preferred embodiment and selected modifications of the invention have been disclosed and described, it is apparent that other embodiments and modifications of the invention are possible within the scope of the appended claims.

What is claimed is:

1. Fuel metering apparatus for supplying matered rates of fuel flow to a combustion engine, comprising body means, induction passage means formed through said body means for supplying motive fluid to said engine, throttle valve means situated in said induction passage means for variably controlling the rate of flow of air through said induction passage means, fuel-air-emulsion discharge means situated in said induction passage means downstream of said throttle valve means, air passage means communicating betweeen a source of air and said fuel-air-emulsion discharge means, fuel metering means for metering liquid fuel under superatmospheric pressure in response to engine demands and indicia of engine operation, said liquid fuel when metered by said fuel metering means being discharged into said air passage means at an area thereof downstream of said source of air and upstream of said fuel-air-emulsion discharge means, said fuel-air-emulsion discharge means comprising a tubular means extending transversely of and through said induction passage means, said tubular means comprising fuel-air-emulsion passage means for the flow therethrough of an emulsion of said metered liquid fuel and air from said source of air, a plurality of discharge ports formed in said tubular means for communicating said fuel-air-emulsion to said induction passage means, electrical resistance heating means carried by said tubular means, said heating means being effective to at least at times elevate the temperature of said fuel-air-emulsion discharge means to thereby cause such of said fuel-air-emulsion as flows through said tubular means to be heated prior to its discharge through said plurality of discharge ports and into said induction passage means during all conditions of engine operation whereby such discharged fuel-air-emulsion mixes with the flow of air flowing through said induction passage means and past said throttle valve means to form a combustible-fuel-air-mixture, wherein said tubular means further comprises a tubular member, wherein said fuel-air-emulsion passage means comprises at least a portion of said tubular member, and temperature insulating means, said temperature insulating means being carried by said tubular member, and wherein said electrical resistance heating means is situated as to be generally radially inwardly of said temperature insulating means.

2. Fuel metering apparatus according to claim 1 wherein said electrical resistance heating means comprises electrical conductor means coiled about said tubular member and extending axially therealong for at least a major portion of the axial length of said tubular member.

3. Fuel metering apparatus according to claim 1 wherein said plurality of discharge ports are so located as to extend between said plurality of coils of said coiled electrical conductor means.

4. Fuel metering apparatus according to claim 1 wherein respective ones of said plurality of discharge ports are so located as to extend between adjacent ones of said plurality of coils of said coiled electrical conductor means.

5. Fuel metering apparatus for supplying metered rates of fuel flow to a combustion engine, comprising body means, induction passage means formed through said body means for supplying motive fluid to said engine, throttle valve means situated in said induction passage means for variably controlling the rate of flow of air through said induction passage means, fuel-air-emulsion discharge means situated in said induction passage means downstream of said throttle valve means, air passage means communicating between a source of air and said fuel-air-emulsion discharge means, fuel metering means for metering liquid fuel under superatmospheric pressure in response to engine demands and indicia of engine operation, said liquid fuel when metered by said fuel metering means being discharged into said air passage means at an area thereof downstream of said source of air and upstream of said fuel-air-emulsion discharge means, said fuel-air-emulsion discharge means comprising a tubular means extending transversely of and through said induction passage means, said tubular means comprising fuel-air-emulsion passage means for the flow therethrough of an emulsion of said metered liquid fuel and air from said source of air, a plurality of discharge ports formed in said tubular means for communicating said fuel-air-emulsion to said induction passage means, electrical resistance heating means carried by said tubular means, said heating means being effective to at least at times elevate the temperature of said fuel-air-emulsion discharge means to thereby cause such of said fuel-air-emulsion as flows through said tubular means to be heated prior to its discharge through said plurality of discharge ports and into said induction passage means during all conditions of engine operation whereby such discharged fuel-air-emulsion mixes with the flow of air flowing through said induction passage means and past said throttle valve means to form a combustible-fuel-air-mixture, wherein said tubular means further comprises a tubular member, wherein said fuel-air-emulsion passage means comprises at least a portion of said tubular member, and temperature insulating means, said temperature insulating means being carried by and externally of said tubular member, and wherein said electrical resistance heating means is situated as to be generally contained by said temperature insulating means externally of said tubular member.

6. Fuel metering apparatus according to claim 5 wherein said electrical resistance heating means comprises electrical conductor means coiled about said tubular member and extending axially therealong for at least a major portion of the axial length of said tubular member.

7. Fuel metering apparatus according to claim 5 wherein said plurality of discharge ports are so located as to extend between said plurality of coils of said coiled electrical conductor means.

8. Fuel metering apparatus according to claim 5 wherein respective ones of said plurality of discharge ports are so located as to extend between adjacent ones of said plurality of coils of said coiled electrical conductor means.

9. Fuel metering apparatus for supplying metered rates of fuel flow to a combustion engine, comprising body means, induction passage means formed through said body means for supplying motive fluid to said engine, throttle valve means situated in said induction passage means for variably controlling the rate of flow of air through said induction passage means, fuel-air-emulsion discharge means situated in said induction passage means downstream of said throttle valve means, air passage means communicating between a source of air and said fuel-air-emulsion discharge means, fuel metering means for metering liquid fuel under superatmospheric pressure in response to engine demands and indicia of engine operation, said liquid fuel when metered by said fuel metering means being discharged into said air passage means at an area thereof downstream of said source of air and upstream of said fuel-air-emulsion discharge means, said fuel-air-emulsion discharge means comprising a tubular means extending transversely of and through said induction passage means, said tubular means comprising fuel-air-emulsion passage means for the flow therethrough of an emulsion of said metered liquid fuel and air from said source of air, a plurality of discharge ports formed in said tubular means for communicating said fuel-air-emulsion to said induction passage means, electrical resistance heating means carried by said tubular means, said heating means being effective to at least at times elevate the temperature of said fuel-air-emulsion discharge means to thereby cause such of said fuel-air-emulsion as flows through said tubular means to be heated prior to its discharge through said plurality of discharge ports and into said induction passage means during all conditions of engine operation whereby such discharged fuel-air-emulsion mixes with the flow of air flowing through said induction passage means and past said throttle valve means to form a combustible-fuel-air-mixture, wherein said tubular means also comprises flow restriction means communicating with said fuel-air-emulsion passage means, wherein said flow restriction means is calibrated as to provide for sonic flow therethrough for at least certain conditions of engine operation, wherein said tubular means further comprises a tubular member, wherein said flow restriction means comprises a portion of said tubular member, and temperature insulating means, said temperature insulating means being carried externally of said tubular member.

10. Fuel metering apparatus according to claim 9 wherein a first portion of said temperature insulating means is operatively carried by said body means at generally one side of said induction passage means, wherin a second portion of said temperature insulating means is operatively carried generally by and within said body means at generally a second side of said induction passage means generally opposite to said one side of said induction passage means, and wherein said flow restriction means is situated in said second portion of said temperature insulating means.

11. Fuel metering apparatus according to claim 9 wherein said plurality of discharge ports are so located as to extend between said plurality of coils of said coiled electrical conductor means.

12. Fuel metering apparatus according to claim 9 wherein respective ones of said plurality of discharge ports are so located as to extend between adjacent ones of said plurality of coils of said coiled electrical conductor means.

13. Fuel metering apparatus for supplying metered rates of fuel flow to a combustion engine, comprising body means, induction passage means formed through said body means for supplying motive fluid to said engine, throttle valve means situated in said induction passage means for variably controlling the rate of flow of air through said induction passage means, fuel-air-emulsion discharge means situated in said induction passage means downstream of said throttle valve means, air passage means communicating between a source of air and said fuel-air-emulsion discharge means, fuel metering means for metering liquid fuel under superatmospheric pressure in response to engine demands and indicia of engine operation, said liquid fuel when metered by said fuel metering means being discharged into said air passage means at an area thereof downstream of said source of air and upstream of said fuel-air-emulsion discharge means, said fuel-air-emulsion discharge means comprising a tubular means extending transversely of and through said induction passage means, said tubular means comprising fuel-air-emulsion passage means for the flow therethrough of an emulsion of said metered liquid fuel and air from said source of air, a plurality of discharge ports formed in said tubular means for communicating said fuel-air-emulsion to said induction passage means, electrical resistance heating means carried by said tubular means, said heating means being effective to at least at times elevate the temperature of said fuel-air-emulsion discharge means to thereby cause such of said fuel-air-emulsion as flows through said tubular means to be heated prior to its discharge through said plurality of discharge ports and into said induction passage means during all conditions of engine operation whereby such discharged fuel-air-emulsion mixes with the flow of air flowing through said induction passage means and past said throttle valve means to form a combustible-fuel-air-mixture, wherein said tubular means further comprises a tubular member, wherein said fuel-air-emulsion passage means comprises at least a portion of said tubular member, and temperature insulating means, said temperature insulating means being carried externally of said tubular member.

14. Fuel metering apparatus according to claim 13 wherein said electrical resistance heating means comprises electrical conductor means coiled about said tubular member and extending axially therealong for at least a major portion of the axial length of said tubular member.

15. Fuel metering apparatus according to claim 13 wherein said electrical resistance heating means comprises electrical conductor means coiled as to have a plurality of coils about said tubular member and extending axially therealong for at least a major portion of the axial length of said tubular member, and wherein respective ones of said plurality of discharge ports are so located as to extend between adjacent ones of said plurality of coils of said coiled electrical conductor means.

16. Fuel metering apparatus according to claim 13 wherein said plurality of discharge ports are so located as to extend between said plurality of coils of said coiled electrical conductor means.

17. Fuel metering apparatus according to claim 13 wherein respective ones of said plurality of discharge ports are so located as to extend between adjacent ones of said plurality of coils of said coiled electrical conductor means.

18. Fuel metering apparatus for supplying metered rates of fuel flow to a combustion engine, comprising body means, induction passage means formed through said body means for supplying motive fluid to said engine, throttle valve means situated in said induction passage means for variably controlling the rate of flow of air through said induction passage means, fuel-air-emulsion discharge means situated in said induction passage means downstream of said throttle valve means, air passage means communicating between a source of air and said fuel-air-emulsion discharge means, fuel metering means for metering liquid fuel under superatmospheric pressure in response to engine demands and indicia of engine operation, said liquid fuel when metered by said fuel metering means being discharged into said air passage means at an area thereof downstream of said source of air and upstream of said fuel-air-emulsion discharge means, said fuel-air-emulsion discharge means comprising a tubular means extending transversely of and through said induction passage means, said tubular means comprising fuel-air-emulsion passage means for the flow therethrough of an emulsion of said metered liquid fuel and air from said source of air, a plurality of discharge ports formed in said tubular means for communicating said fuel-air-emulsion to said induction passage means, and electrical resistance heating means carried by said tubular means, said heating means being effective to at least at times elevate the temperature of said fuel-air-emulsion discharge means to thereby cause such of said fuel-air-emulsion as flows through said tubular means to be heated prior to its discharge through said plurality of discharge ports and into said induction passage means during all conditions of engine operation whereby such discharged fuel-air-emulsion mixes with the flow of air flowing through said induction passage means and past said throttle valve means to form a combustible-fuel-air-mixture, wherein said tubular means comprises a tubular member, wherein said fuel-air-emulsion passage means comprises at least a portion of said tubular member, and wherein said electrical resistance heating means is carried by said tubular member as to be at least in part in intimate contact with said tubular member externally thereof.

19. Fuel metering apparatus according to claim 18 wherein said plurality of discharge ports are so located as to extend between said plurality of coils of said coiled electrical conductor means.

20. Fuel metering apparatus according to claim 18 wherein respective ones of said plurality of discharge ports are so located as to extend between adjacent ones of said plurality of coils of said coiled electrical conductor means.

21. Fuel metering apparatus according to claim 18 wherein said electrical resistance heating means comprises electrical conductor means coiled about said tubular member and extending axially therealong for at least a major portion of the axial length of said tubular member.

22. Fuel metering apparatus according to claim 21 wherein said tubular means also comprises temperature and electrical insulating means, said temperature and electrical insulating means being carried by said tubular member, and wherein said electrical resistance heating means is situated as to be generally radially inwardly of said temperature and electrical insulating means.

* * * * *